United States Patent
Maeda

(10) Patent No.: US 9,534,574 B2
(45) Date of Patent: Jan. 3, 2017

(54) VEHICLE, CONTROL APPARATUS AND CONTROL METHOD

(71) Applicant: TOYOTA JIDOSHA KABUSHIKI KAISHA, Toyota-shi, Aichi-ken (JP)

(72) Inventor: Tomoharu Maeda, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/647,197

(22) PCT Filed: Dec. 27, 2012

(86) PCT No.: PCT/JP2012/008395
§ 371 (c)(1),
(2) Date: May 26, 2015

(87) PCT Pub. No.: WO2014/102877
PCT Pub. Date: Jul. 3, 2014

(65) Prior Publication Data
US 2015/0292464 A1 Oct. 15, 2015

(51) Int. Cl.
*F02N 11/08* (2006.01)
*B60W 10/06* (2006.01)

(52) U.S. Cl.
CPC ....... *F02N 11/0814* (2013.01); *F02N 11/0825* (2013.01); *F02N 2200/061* (2013.01); *F02N 2200/063* (2013.01); *Y02T 10/48* (2013.01)

(58) Field of Classification Search
CPC .......... F02D 17/00; F02D 45/00; F02N 11/08; F02N 11/0814; F02N 11/0825; F02N 11/0862; F02N 11/087; F02N 2200/061; F02N 2200/063; Y02T 10/48; B60W 10/06; B60W 10/08; B60W 10/24
(Continued)

(56) References Cited

U.S. PATENT DOCUMENTS 5,177,369 A * 1/1993 Kamiya ................ F02D 41/042
290/1 A
5,221,861 A * 6/1993 Kinsell ............... F02N 11/0866
123/179.3
(Continued)

FOREIGN PATENT DOCUMENTS

EP 1079496 A2 2/2001
JP 2007-040229 A 2/2007
(Continued)

*Primary Examiner* — John Kwon
*Assistant Examiner* — Johnny H Hoang
(74) *Attorney, Agent, or Firm* — Sughrue Mion, PLLC

(57) ABSTRACT

A vehicle comprises: a storage battery configured to store electric power; an internal combustion engine configured to be started with electric power supplied from the storage battery; an electric auxiliary configured to operate with the electric power supplied from the storage battery; and a stop start controller configured to perform a stop control of stopping the internal combustion engine according to a driving condition of the vehicle and a restart control of restarting the internal combustion engine that has been stopped by the stop control. The stop start controller includes: an auxiliary voltage acquirer configured to obtain a measured auxiliary voltage value that denotes a voltage of the electric auxiliary measured on occasion of start of the internal combustion engine; and a feasibility determiner configured to determine whether the stop control is feasible, based on the measured auxiliary voltage value.

7 Claims, 5 Drawing Sheets

(58) Field of Classification Search
 USPC ...... 701/112–114; 123/179.3, 179.4, 179.19; 290/27, 28, 38 R
 See application file for complete search history.

(56) References Cited

U.S. PATENT DOCUMENTS

| | | | | |
|---|---|---|---|---|
| 7,552,705 | B2* | 6/2009 | Serkh | B60K 6/28 123/179.4 |
| 7,963,264 | B2* | 6/2011 | Reynolds | F02N 11/0866 123/179.3 |
| 2009/0115419 | A1 | 5/2009 | Ueda et al. | |
| 2009/0295399 | A1 | 12/2009 | Ueda et al. | |
| 2014/0081561 | A1* | 3/2014 | Be | B60W 50/085 701/112 |
| 2014/0278019 | A1* | 9/2014 | Be | F02D 29/02 701/112 |

FOREIGN PATENT DOCUMENTS

| | | |
|---|---|---|
| JP | 2010-024906 A | 2/2010 |
| JP | 2012-149627 A | 8/2012 |
| JP | 2012-172567 A | 9/2012 |

* cited by examiner

VEHICLE, CONTROL APPARATUS AND CONTROL METHOD

CROSS REFERENCE TO RELATED APPLICATIONS

This application is a National Stage of International Application No. PCT/JP2012/008395 filed Dec. 27, 2012, the contents of all of which are incorporated herein by reference in their entirety.

TECHNICAL FIELD

The present invention relates to a vehicle, a control apparatus and a control method.

BACKGROUND ART

A vehicle equipped with an internal combustion engine runs with power generated by the internal combustion engine. This vehicle is equipped with a storage battery (battery) and electric auxiliaries, in addition to the internal combustion engine. The internal combustion engine is started with the electric power supplied from the storage battery. The electric auxiliaries operate with the electric power supplied from the storage battery. The electric auxiliaries include, for example, various control devices, an electronic control fuel injection device, an actuator for transmission control and an electric power assisted steering.

As is known, the vehicle equipped with the internal combustion engine performs idle reduction to reduce idling of the internal combustion engine for the purpose of saving the fuel consumption and reducing the emission gas. Idle reduction is also expressed as idle stop, idling stop, engine stop at vehicle stop or no idling. Idle reduction control for controlling idle reduction (stop start control) includes a stop control of stopping the internal combustion engine according to the driving condition of the vehicle and a restart control of restarting the internal combustion engine that has been stopped by the stop control.

Patent Literature 1 describes idle reduction control to determine whether the stop control is feasible, based on the voltage of the storage battery detected during a stop period of the internal combustion engine. Patent Literature 2 describes idle reduction control to determine whether the stop control is feasible, based on the voltage of the storage battery detected on the occasion of restart of the internal combustion engine by the restart control.

CITATION LIST

Patent Literature

PTL 1: JP 2010-24906A
PTL 2: JP 2012-172567A

SUMMARY

Technical Problem

The idle reduction controls described in Patent Literatures 1 and 2, however, do not take into account a voltage drop between the storage battery and the electric auxiliary and may fail to ensure a voltage required for the operation of the electric auxiliary on the occasion of restart of the internal combustion engine by the restart control. The voltage drop in the electric auxiliary is varied depending on the electrical specification of the vehicle (for example, the length of a wiring for connecting the storage battery with each electric auxiliary and the types of the electric auxiliaries mounted on the vehicle) and the operating conditions of the electric auxiliaries. Idle reduction control on the assumption of a significant voltage drop in the electric auxiliary may, however, lead to excessively reduce idle reduction and fail to sufficiently save the fuel consumption and reduce the emission gas.

There is accordingly a need to provide a technique that enhances the effect of idle reduction while ensuring the operation of the electric auxiliary. With respect to the vehicle that performs idle reduction, other needs include cost reduction, resource saving, easy manufacture, improvement of usability and improvement of durability.

Solution to Problem

In order to solve at least part of the problems described above, the invention may be implemented by the following aspects.

(1) According to one aspect of the invention, there is provided a vehicle. The vehicle comprises a storage battery configured to store electric power; an internal combustion engine configured to be started with electric power supplied from the storage battery; an electric auxiliary configured to operate with the electric power supplied from the storage battery; and a stop start controller configured to perform a stop control of stopping the internal combustion engine according to a driving condition of the vehicle and a restart control of restarting the internal combustion engine that has been stopped by the stop control. The stop start controller includes an auxiliary voltage acquirer configured to obtain a measured auxiliary voltage value that denotes a voltage of the electric auxiliary measured on occasion of start of the internal combustion engine; and a feasibility determiner configured to determine whether the stop control is feasible, based on the measured auxiliary voltage value. The vehicle of this aspect determines whether the stop control is feasible by taking into account the voltage of the electric auxiliary. This results in enhancing the effect of idle reduction, while ensuring the operation of the electric auxiliary.

(2) In the vehicle of the above aspect, the feasibility determiner may include an auxiliary voltage estimator configured to estimate an estimated auxiliary voltage value that denotes a voltage of the electric auxiliary expected on occasion of next restart control, based on the measured auxiliary voltage value; and a determination switcher configured to switch over a result of determination of whether the stop control is feasible, according to the estimated auxiliary voltage value. The vehicle of this aspect determines whether the stop control is feasible in a flexible manner according to a variation in estimated auxiliary voltage value.

(3) The vehicle of the above aspect may further comprise a battery voltage estimator configured to estimate an estimated battery voltage value that denotes a voltage of the storage battery expected on occasion of next start of the internal combustion engine. The auxiliary voltage estimator may include a variation calculator configured to calculate a variation of the estimated battery voltage value from a time when the measured auxiliary voltage value has been measured, based on the estimated battery voltage value; and an estimated value calculator configured to calculate the estimated auxiliary voltage value based on the measured auxiliary voltage value and the variation. The vehicle of this aspect enhances the accuracy of the estimated auxiliary voltage value.

(4) In the vehicle of the above aspect, the measured auxiliary voltage value may include at least one of a measurement value that denotes a voltage of the electric auxiliary measured on occasion of start of the internal combustion engine accompanied with a start of the vehicle and a measurement value that denotes a voltage of the electric auxiliary measured on occasion of restart of the internal combustion engine accompanied with execution of the restart control. The vehicle of this aspect determines whether the stop control is feasible, based on the measured auxiliary voltage value measured at least one of the occasion of start of the vehicle and the occasion of execution of the restart control.

(5) In the vehicle of the above aspect, the electric auxiliary may include the stop start controller. The stop start controller may include a terminal configured to receive the electric power supplied from the storage battery. A voltage of the electric auxiliary may be a voltage of the terminal. The vehicle of this aspect enables the measured auxiliary voltage value to be obtained readily, compared with the case of using a voltage of another electric auxiliary.

The invention may be implemented by a variety of aspects other than the vehicle. The invention may be actualized by, for example, a control device for an internal combustion engine, a control method of an internal combustion engine, and a computer program that implements the control method.

DESCRIPTION OF EMBODIMENTS

A. Embodiment

Figure 1:
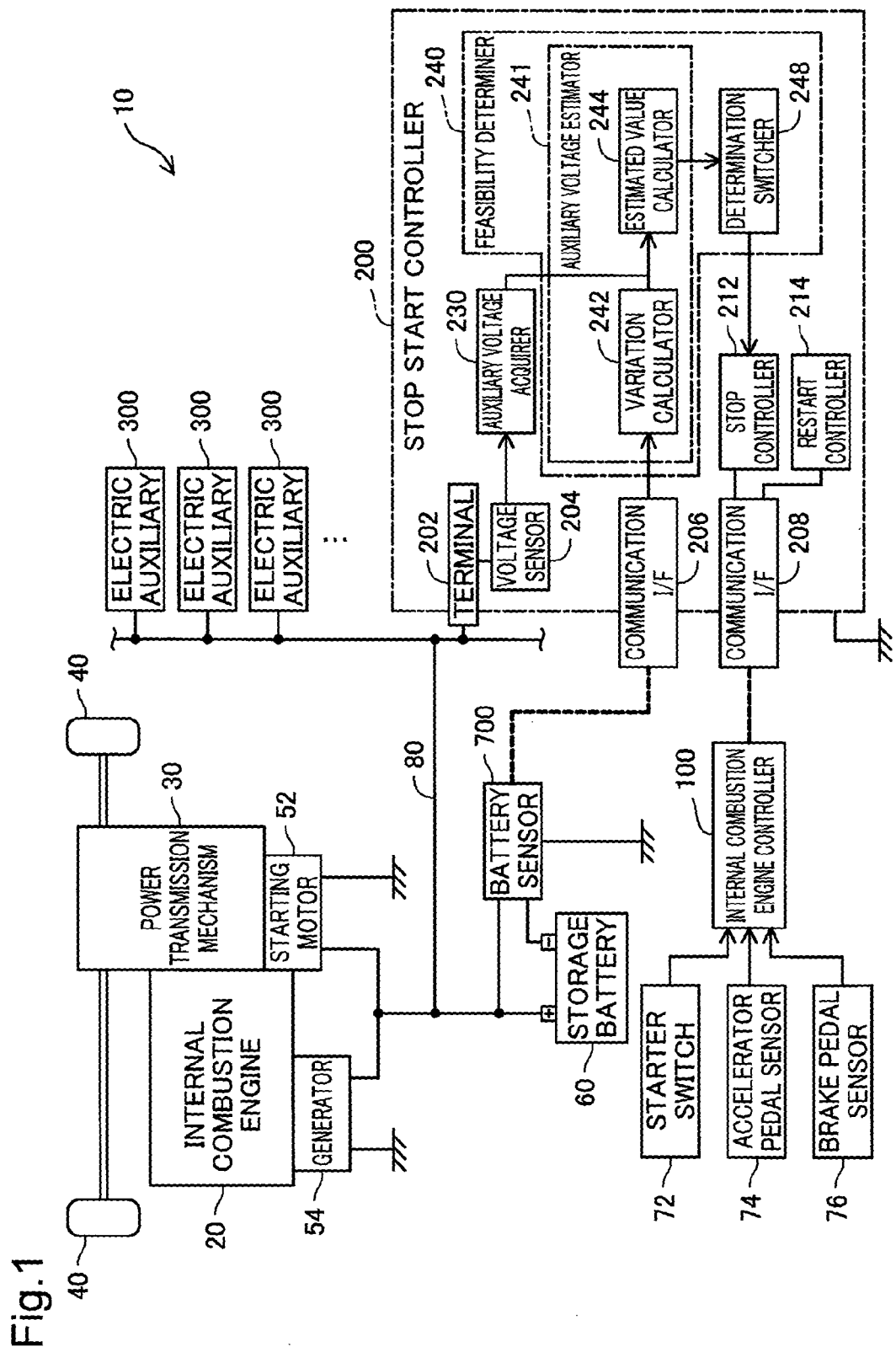
FIG. 1 is a diagram illustrating the configuration of a vehicle.

FIG. 1 is a diagram illustrating the configuration of a vehicle 10. The vehicle 10 has an internal combustion engine 20 and runs with the power generated by the internal combustion engine 20. The vehicle 10 performs idle reduction to reduce idling of the internal combustion engine.

The vehicle 10 includes a power transmission mechanism 30, drive wheels 40, a starting motor 52, a generator 54, a storage battery 60, a starter switch 72, an accelerator pedal sensor 74 and a brake pedal sensor 76, in addition to the internal combustion engine 20. The vehicle 10 also includes an internal combustion engine controller 100, a stop start controller 200, electric auxiliaries 300 and a battery sensor 700.

The internal combustion engine 20 of the vehicle 10 is a machine configured to combust a fuel and take out power. The internal combustion engine 20 is also called engine. According to this embodiment, the internal combustion engine 20 is a gasoline engine that uses gasoline as the fuel. According to another embodiment, the internal combustion engine 20 may be a diesel engine.

The internal combustion engine 20 is started with the electric power supplied from the storage battery 60. According to this embodiment, at start of the internal combustion engine 20, the electric power supplied from the storage battery 60 is converted into a rotational torque by the starting motor 52, and the internal combustion engine 20 uses the rotational torque by the starting motor 52 to start. The starting motor 52 is also called starter motor.

The power transmission mechanism 30 of the vehicle 10 transmits the power of the internal combustion engine 20 to the drive wheels 40. According to this embodiment, the power transmission mechanism 30 includes a transmission, a differential gear and a driveshaft.

The generator 54 of the vehicle 10 uses the power of the internal combustion engine 20 to generate electric power. According to this embodiment, the generator 54 is an alternator equipped with a rectifier. The electric power generated by the generator 54 is used to charge the storage battery 60 and operate various electric auxiliaries.

The storage battery 60 of the vehicle 10 is a secondary battery configured to store electric power. The storage battery 60 may also be called battery. According to this embodiment, the storage battery 60 is a lead acid battery. According to another embodiment, the storage battery 60 may be a lithium ion secondary battery or a nickel hydride rechargeable battery. According to this embodiment, the storage battery 60 is charged by the generator 54. The storage battery 60 supplies electric power to the various electric auxiliaries.

The starter switch 72 of the vehicle 10 receives a drive start instruction and a drive stop instruction of the vehicle 10 from the driver of the vehicle 10. According to this embodiment, the starter switch 72 is one of electric auxiliaries that operate with the electric power supplied from the storage battery 60.

The accelerator pedal sensor 74 of the vehicle 10 detects the operation state of an accelerator pedal (not shown) by the driver of the vehicle 10. According to this embodiment, the accelerator pedal sensor 74 is one of the electric auxiliaries that operate with the electric power supplied from the storage battery 60.

The brake pedal sensor 76 of the vehicle 10 detects the operation state of a brake pedal (not shown) by the driver of the vehicle 10. According to this embodiment, the brake pedal sensor 76 is one of the electric auxiliaries that operate with the electric power supplied from the storage battery 60.

The internal combustion engine controller 100 of the vehicle 10 is a control device configured to control the operation of the internal combustion engine 20. The internal combustion engine controller 100 is also called engine control unit (ECU). According to this embodiment, when the starter switch 72 receives a drive start instruction, the internal combustion engine controller 100 operates the starter motor 52 to start the internal combustion engine 20. According to this embodiment, the internal combustion engine controller 100 activates the internal combustion engine 20, in response to an input signal from the accelerator pedal sensor 74 and an input signal from the brake pedal sensor 76. According to this embodiment, the internal combustion engine controller 100 is one of the electric auxiliaries that operate with the electric power supplied from the storage battery 60.

The stop start controller 200 of the vehicle 10 is a control device configured to perform idle reduction control (stop start control) for controlling idle reduction of the internal combustion engine 20. According to this embodiment, the stop start controller 200 is one of the electric auxiliaries that operate with the electric power supplied from the storage battery 60. According to another embodiment, the stop start controller 200 may be part of the internal combustion engine controller 100.

The stop start controller 200 includes a terminal 202, a voltage sensor 204, a communication interface (communication I/F) 206, another communication interface (communication I/F) 208, a stop controller 212, a restart controller 214, an auxiliary voltage acquirer 230 and a feasibility determiner 240.

The terminal 202 of the stop start controller 200 receives the electric power supplied from the storage battery 60. The stop start controller 200 operates with the electric power supplied to the terminal 202. According to this embodiment, the terminal 202 is connected with the storage battery 60 via a wiring 80. According to this embodiment, the terminal 202 is electrically connected in parallel with the other electric auxiliaries 300.

The voltage sensor 204 of the stop start controller 200 is a sensor configured to detect a voltage that is to be applied to the terminal 202. According to this embodiment, the terminal 202 is electrically connected in parallel with the other electric auxiliaries 300, so that the voltage detected by the voltage sensor 204 represents the voltage of the stop start controller 200, as well as the voltage of the other electric auxiliaries 300.

The communication interface 206 of the stop start controller 200 communicates with the battery sensor 700 such as to allow for transmission of information to and from the battery sensor 700. According to this embodiment, the communication interface 206 receives, from the battery sensor 700, an estimated battery voltage value EBe that denotes a voltage of the storage battery 60 expected on the occasion of next start of the internal combustion engine 20. According to this embodiment, the communication interface 206 conforms to LIN (local interconnect network).

The communication interface 208 of the stop start controller 200 communicates with the internal combustion engine controller 100 such as to allow for transmission of information to and from the internal combustion engine controller 100. According to this embodiment, the communication interface 208 conforms to CAN (controller area network).

The stop controller 212 of the stop start controller 200 performs stop control to stop the internal combustion engine 20 according to the driving condition of the vehicle 10. The restart controller 214 of the stop start controller 200 performs restart control to restart the internal combustion engine 20 that has been stopped through the stop control by the stop controller 212. According to this embodiment, the stop controller 212 and the restart controller 214 give corresponding instructions to the internal combustion engine controller 100 via the communication interface 208, so as to stop and restart the internal combustion engine 20.

The auxiliary voltage acquirer 230 of the stop start controller 200 obtains a measured auxiliary voltage value EAm that denotes a voltage of the stop start controller 200 measured on the occasion of start of the internal combustion engine 20. According to this embodiment, the auxiliary voltage acquirer 230 obtains the measured auxiliary voltage value EAm, based on a detection signal from the voltage sensor 204. According to another embodiment, the auxiliary voltage acquirer 230 may obtain the measured auxiliary voltage value EAm, based on a detection signal from a voltage sensor provided in at least one of the wiring 80 and another electric auxiliary 300.

The feasibility determiner 240 of the stop start controller 200 determines whether the stop control by the stop controller 212 is feasible, based on the measured auxiliary voltage value EAm. According to this embodiment, the feasibility determiner 240 includes an auxiliary voltage estimator 241 and a determination switcher 248.

The auxiliary voltage estimator 241 of the feasibility determiner 240 estimates an estimated auxiliary voltage value EAe that denotes a voltage of the stop start controller 200 expected on the occasion of next restart control by the restart controller 240, based on the measured auxiliary voltage value EAm. According to this embodiment, the auxiliary voltage estimator 241 includes a variation calculator 242 and an estimated value calculator 244. The variation calculator 242 of the auxiliary voltage estimator 241 calculates a variation DEBe of an estimated battery voltage value EBe from the time when the measured auxiliary voltage value EAm has been measured, based on the estimated batter voltage value EBe obtained from the battery sensor 700 via the communication interface 206. The estimated value calculator 244 of the auxiliary voltage estimator 241 calculates the estimated auxiliary voltage value EAe, based on the measured auxiliary voltage value EAm obtained by the auxiliary voltage acquirer 230 and the variation DEBe calculated by the variation calculator 242.

The determination switcher 248 of the feasibility determiner 240 switches over the result of determination of whether the stop control by the stop controller 212 is feasible, according to the estimated auxiliary voltage value EAe estimated by the auxiliary voltage estimator 241. Upon determination that the stop control is feasible, the determination switcher 248 permits the stop controller 212 to perform the stop control. Upon determination that the stop control is not feasible, on the other hand, the determination switcher 248 prohibits the stop controller 212 from performing the stop control.

According to this embodiment, the functions of the stop controller 212, the restart controller 214, the auxiliary voltage acquirer 230 and the feasibility determiner 240 of the stop start controller 200 are implemented by the operation of a CPU (central processing unit) according to a computer program. According to another embodiment, at least part of these functions may be implemented by the operation of an ASIC (application specific integrated circuit) based on its circuit configuration.

The electric auxiliaries 300 of the vehicle 10 operate with the electric power supplied from the storage battery 60. According to this embodiment, the electric auxiliaries 300 include at least one of an electronic control fuel injection device, an actuator for transmission control and an electric power assisted steering.

The battery sensor 700 of the vehicle 10 is a sensor configured to detect the state of the storage battery 60. The battery sensor 700 is also called accumulator sensor.

Figure 2:
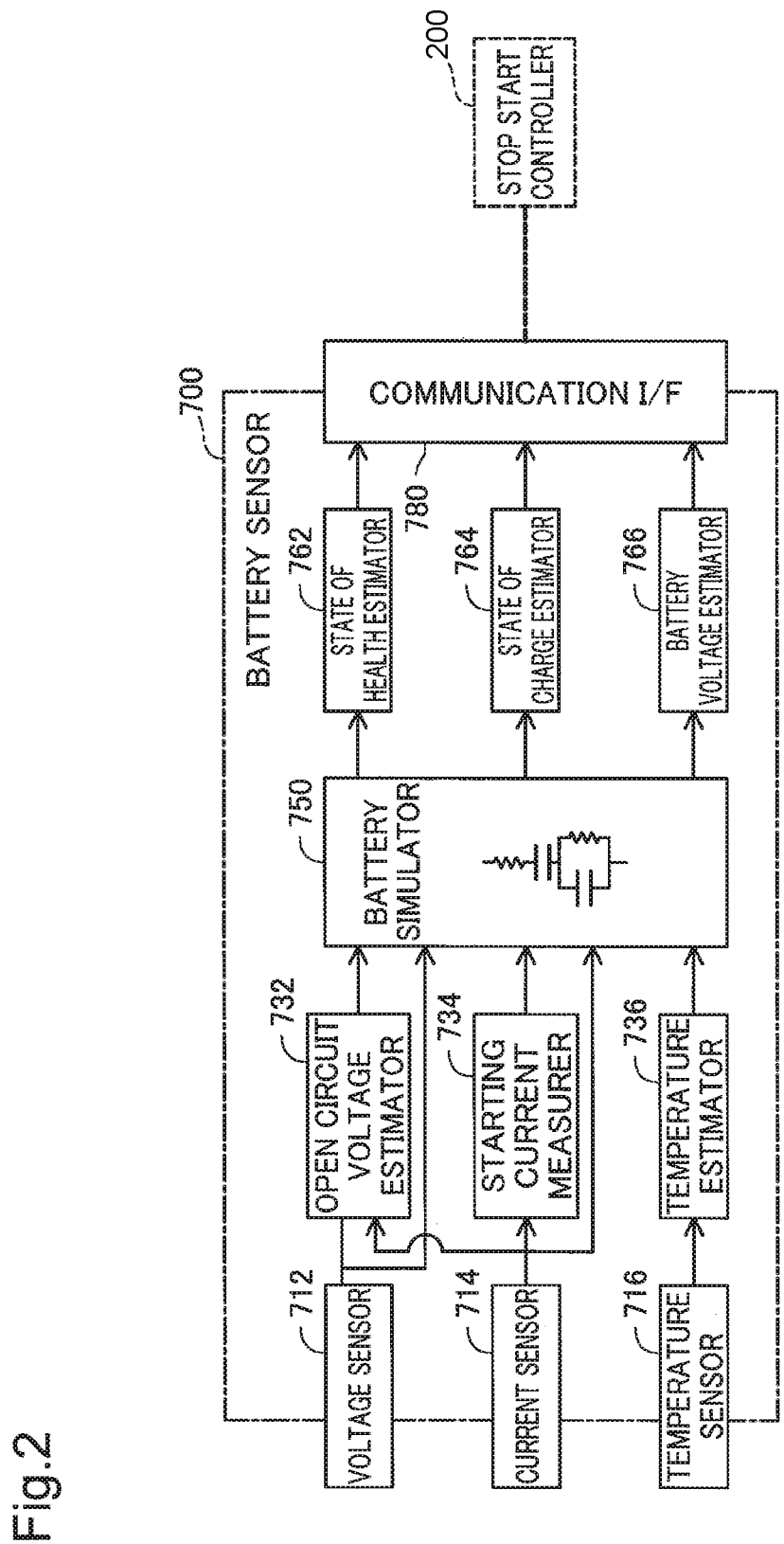
FIG. 2 is a diagram illustrating the detailed configuration of a battery sensor.

FIG. 2 is a diagram illustrating the detailed configuration of the battery sensor 700. The battery sensor 700 includes a voltage sensor 712, a current sensor 714, a temperature sensor 716, an open circuit voltage estimator 732, a starting current measurer 734, a temperature estimator 736, a battery simulator 750, a state of health estimator 762, a state of charge estimator 764, a battery voltage estimator 766 and a communication interface (communication I/F) 780.

The voltage sensor 712 of the battery sensor 700 is a sensor configured to detect a voltage generated between a positive terminal and a negative terminal of the storage battery 60. The current sensor 714 of the battery sensor 700 is a sensor configured to detect an electric current flowing from the positive terminal of the storage battery 60. The temperature sensor 716 of the battery sensor 700 is a sensor configured to detect an ambient temperature of the storage battery 60.

The open circuit voltage estimator 732 of the battery sensor 700 estimates an open circuit voltage (OCV) of the storage battery 60, based on a detection signal from the voltage sensor 712. The starting current measurer 734 measures an electric current flowing from the storage battery 60 at a start of the internal combustion engine 20, based on a detection signal from the current sensor 714. The temperature estimator 736 of the battery sensor 700 estimates an internal temperature of the storage battery 60, based on a detection signal from the temperature sensor 716.

The battery simulator 750 of the battery sensor 700 virtually establishes a storage battery model simulating the storage battery 60 and performs a simulation to estimate the state of the storage battery 60 using this storage battery model. According to this embodiment, the battery simulator 750 corrects parameters of the storage battery model, based on an output signal from at least one sensor among the voltage sensor 712, the current sensor 714 and the temperature sensor 716.

The state of health estimator 762 of the battery sensor 700 estimates a state of health (SOH) of the storage battery 60, based on the simulation by the battery simulator 750. The state of charge simulator 764 of the battery sensor 700 estimates a state of charge (SOC) of the storage battery 60, based on the simulation by the battery simulator 750.

The battery voltage estimator 766 of the battery sensor 700 estimates the estimated battery voltage value EBe that denotes a voltage of the storage battery 60 expected on the occasion of next start of the internal combustion engine 20. According to this embodiment, the estimated battery voltage value EBe shows a minimum voltage of the storage battery 60 expected on the occasion of next start of the internal combustion engine, as a state of function (SOF) of the storage battery 60.

The communication interface 780 of the battery sensor 700 communicates with the stop start controller 200 such as to allow for transmission of information to and from the stop start controller 200. According to this embodiment, the communication interface 780 sends the estimated battery voltage value EBe by the battery voltage estimator 766 to the stop start controller 200. According to this embodiment, the communication interface 780 conforms to LIN.

According to this embodiment, the functions of the open circuit voltage estimator 732, the starting current measurer 734, the temperature estimator 736, the battery simulator 750, the state of health estimator 762, the state of charge estimator 764 and the battery voltage estimator 766 of the battery sensor 700 are implemented by the operation of a CPU according to a computer program. According to another embodiment, at least part of these functions may be implemented by the operation of an ASIC based on its circuit configuration.

Figure 3:
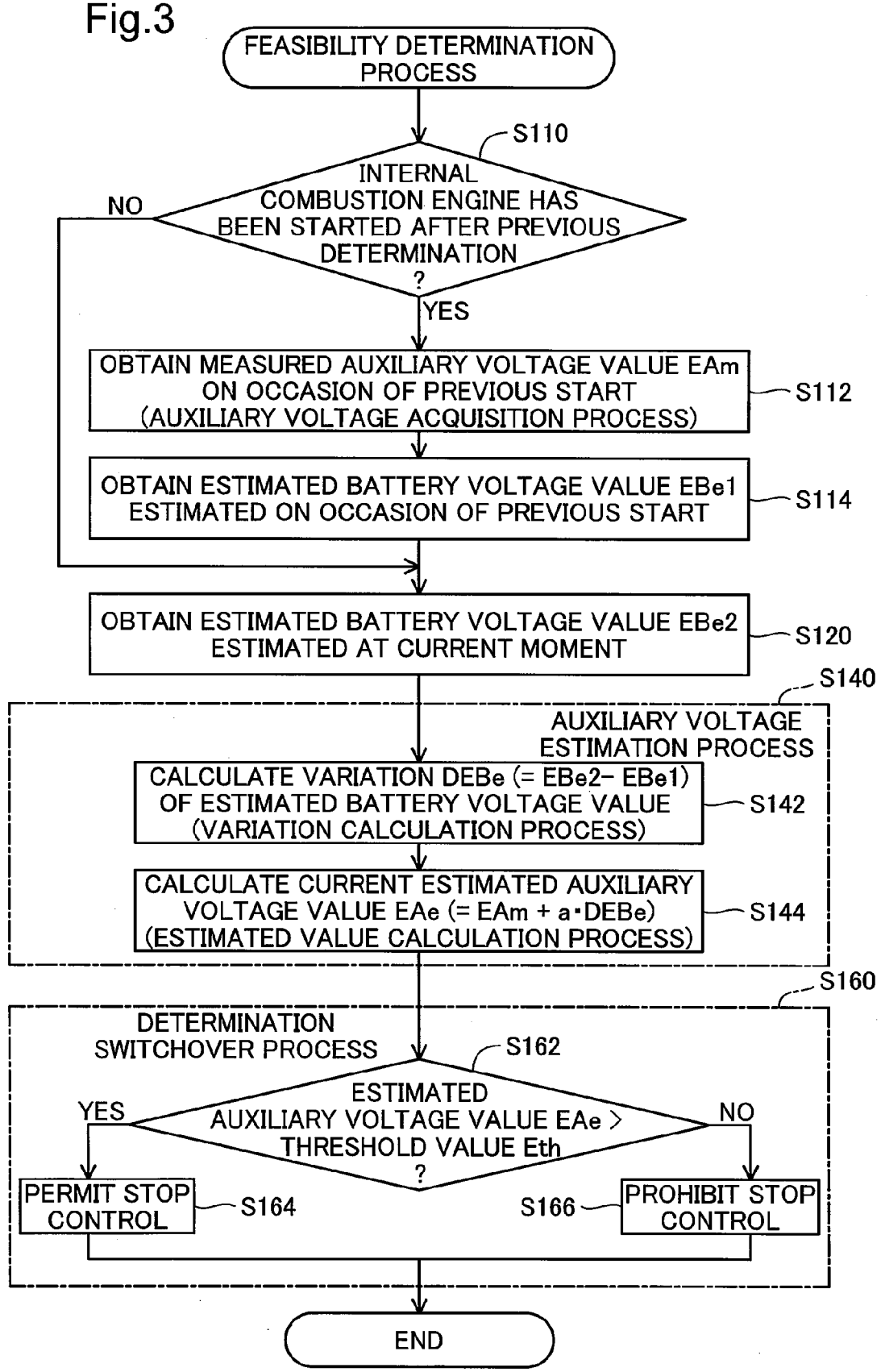
FIG. 3 is a flowchart showing a feasibility determination process performed by a stop start controller of the vehicle.

FIG. 3 is a flowchart showing a feasibility determination process performed by the stop start controller 200 of the vehicle 10. The feasibility determination process of FIG. 3 is a process of determining whether the stop control by the stop controller 212 is feasible. According to this embodiment, the stop start controller 200 performs the feasibility determination process of FIG. 3 at regular intervals (for example, at every several seconds).

On start of the feasibility determination process of FIG. 3, the stop start controller 200 determines whether the internal combustion engine 20 has been started after previous execution of the feasibility determination process (step S110). The start of the internal combustion engine 20 subjected to the determination at step S110 includes a start of the internal combustion engine 20 by the operation of the starter switch 72 and a restart of the internal combustion engine 20 by the restart controller 214.

When the internal combustion engine 20 has been started after previous execution of the feasibility determination process (step S110: YES), the stop start controller 200 performs an auxiliary voltage acquisition process (step S112). In the auxiliary voltage acquisition process (step S112), the stop start controller 200 enables the auxiliary voltage acquirer 230 to obtain the measured auxiliary voltage value EAm measured on the occasion of previous start of the internal combustion engine 20.

After obtaining the measured auxiliary voltage value EAm (step S112), the stop start controller 200 obtains an estimated battery voltage value EBe1 that is the estimated battery voltage value EBe estimated on the occasion of previous start of the internal combustion engine 20, from the battery sensor 700 via the communication interface 206 (step S114).

After the estimated battery voltage value EBe1 is obtained (step S114) or when the internal combustion engine 20 has not been started after previous execution of the feasibility determination process (step S110: NO), the stop start controller 200 obtains an estimated battery voltage value EBe2 that is the estimated battery voltage value EBe estimated at the current moment, from the battery sensor 700 via the communication interface 206 (step S120).

After obtaining the estimated battery voltage value EBe2 (step S120), the stop start controller 200 performs an auxiliary voltage estimation process (step S140). In the auxiliary voltage estimation process (step S140), the stop start controller 200 enables the auxiliary voltage estimator 241 to estimate the estimated auxiliary voltage value EAe, based on the measured auxiliary voltage value EAm.

According to this embodiment, in the auxiliary voltage estimation process (step S140), the stop start controller 200 performs a variation calculation process (step S142). In the variation calculation process (step S142), the stop start controller 200 enables the variation calculator 242 to calculate the variation DEBe, based on the estimated battery voltage value EBe1 and the estimated battery voltage value EBe2. According to this embodiment, the stop start controller 200 calculates the variation DEBe according to Equation (1) given below:

$$DEBe = EBe2 - EBe1 \quad (1)$$

According to this embodiment, after performing the variation calculation process (step S142) in the auxiliary voltage estimation process (step S140), the stop start controller 200 performs an estimated value calculation process (step S144). In the estimated value calculation process (step S144), the stop start controller 200 enables the estimated value calculator 244 to calculate the estimated auxiliary voltage value EAe, based on the measured auxiliary voltage value EAm and the variation DEBe. According to this embodiment, the stop start controller 200 calculates the estimated auxiliary voltage value EAe according to Equation (2) given below:

$$EAe = EAm + a \cdot DEBe \quad (2)$$

According to this embodiment, "a" in Equation (2) is equal to 1. According to another embodiment, "a" in Equation (2) may be less than 1 or may be greater than 1. According to this embodiment, "a" in Equation (2) is a constant. According to another embodiment, "a" in Equation (2) may be a variable that varies according to the state of the vehicle 10.

After calculating the estimated auxiliary voltage value EAe (step S144), the stop start controller 200 performs a determination switchover process (step S160). In the determination switchover process (step S160), the stop start controller 200 enables the determination switcher 248 to switch over the result of determination of whether the stop control by the stop controller 212 is feasible, according to the estimated auxiliary voltage value EAe.

According to this embodiment, in the determination switchover process (step S160), the stop start controller 200 determines whether the estimated auxiliary voltage value EAe is greater than a threshold value Eth (step S162). According to this embodiment, the threshold value Eth is 7.2 V (volts). According to another embodiment, the threshold value Eth may be smaller than 7.2 V or may be greater than 7.2 V.

When the estimated auxiliary voltage value EAe is greater than the threshold value Eth (step S162: YES), the stop start controller 200 determines that the stop control by the stop controller 212 is feasible and permits the stop controller 212 to perform the stop control (step S164). The stop start controller 200 then terminates the feasibility determination process of FIG. 3.

When the estimated auxiliary voltage value EAe is not greater than the threshold value Eth (step S162: NO), the stop start controller 200 determines that the stop control by the stop controller 212 is not feasible and prohibits the stop controller 212 from performing the stop control (step S166). The stop start controller 200 then terminates the feasibility determination process of FIG. 3.

Figure 4:
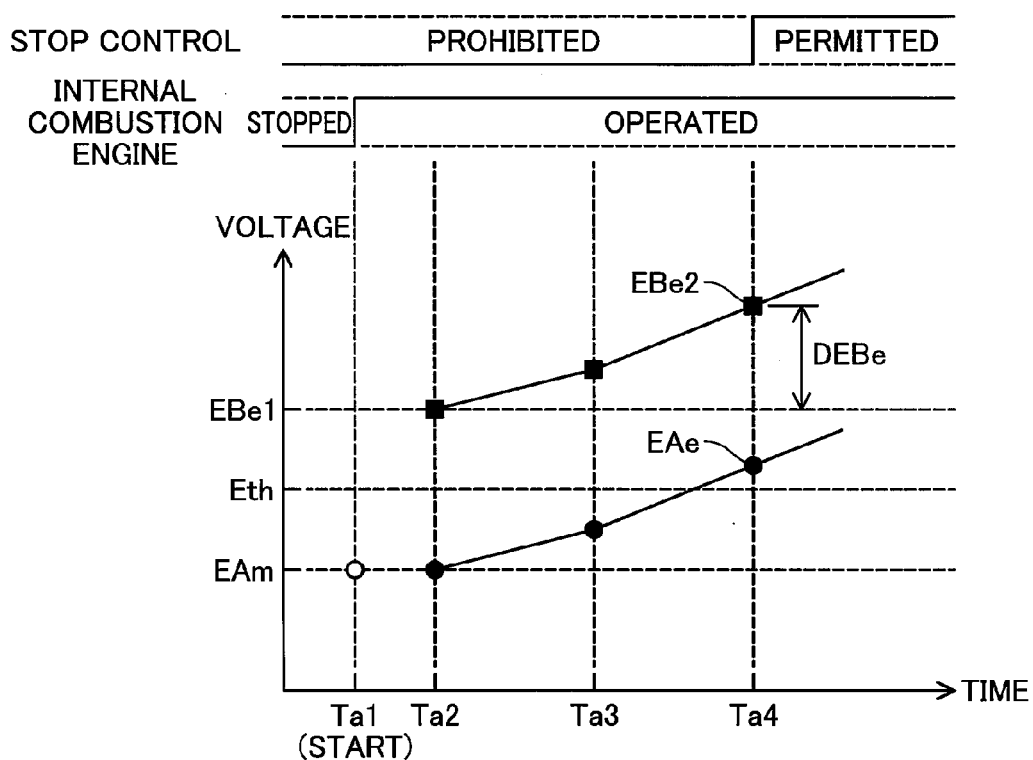
FIG. 4 is a diagram illustrating one example of operation of the stop start controller.

FIG. 4 is a diagram illustrating one example of operation of the stop start controller 200. In the example of FIG. 4, the vehicle 10 is initially not operated, and the internal combustion engine 20 that has been stopped is started by operation of the starter switch 72 (timing Ta1). In the example of FIG. 4, the stop control by the stop controller 212 is prohibited by the feasibility determiner 240 before and after the timing Ta1.

After the start of the internal combustion engine 20 (timing Ta1), when the estimated auxiliary voltage value EAe is not greater than the threshold value Eth (timings Ta2, Ta3), the stop start controller 200 continues prohibition of the stop control by the stop controller 212. When the estimated auxiliary voltage value EAe becomes greater than the threshold value Eth with charge of the storage battery 60 (timing Ta4), the stop start controller 200 permits the stop controller 212 to perform the stop control.

Figure 5:
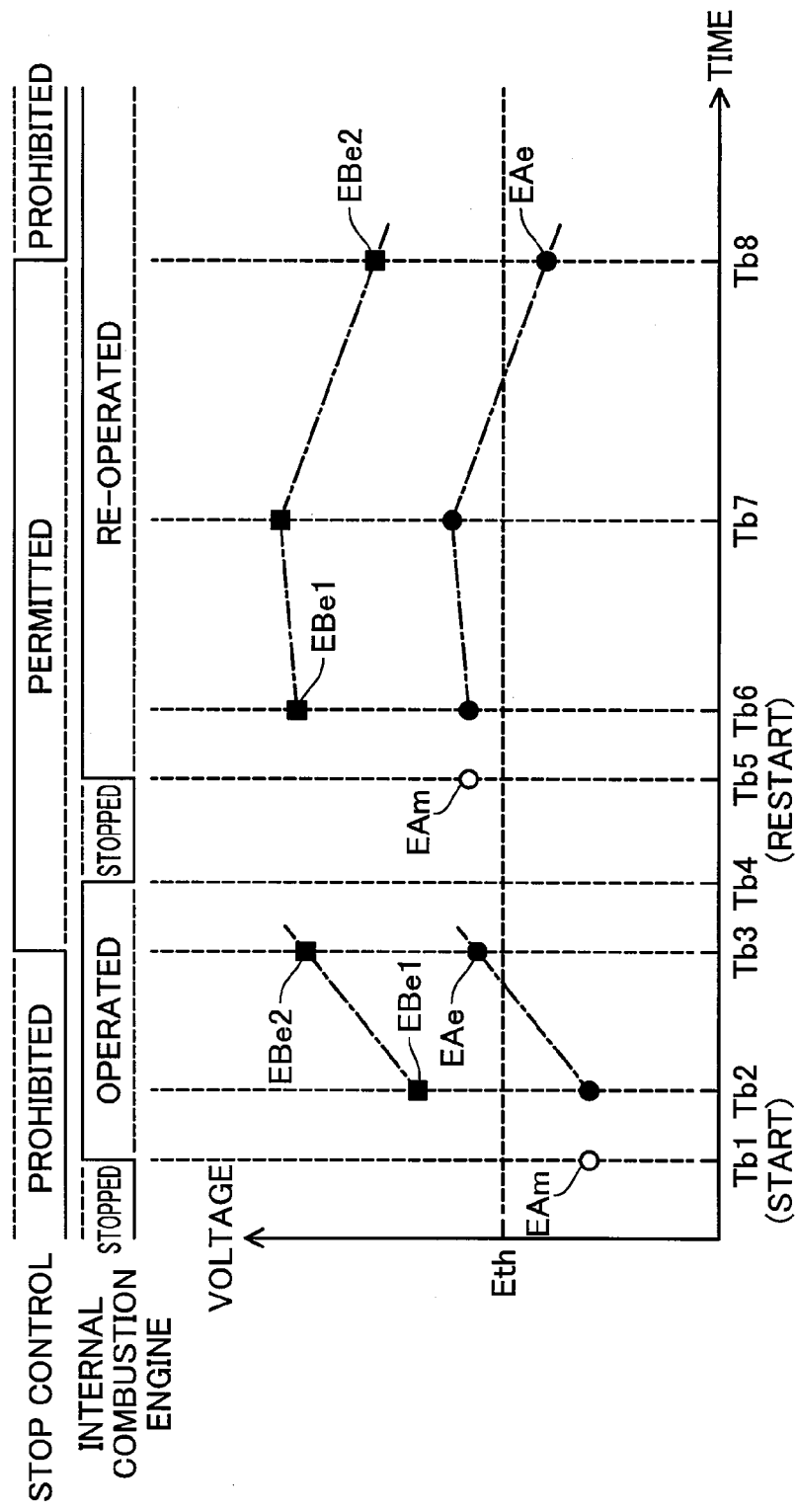
FIG. 5 is a diagram illustrating another example of operation of the stop start controller.

FIG. 5 is a diagram illustrating another example of operation of the stop start controller 200. In the example of FIG. 5, the vehicle 10 is not operated, and the internal combustion engine 20 that has been stopped is started by operation of the starter switch 72 (timing Tb1). In the example of FIG. 5, the stop control by the stop controller 212 is prohibited by the feasibility determiner 240 before and after the timing Tb1.

After the start of the internal combustion engine 20 (timing Tb1), when the estimated auxiliary voltage value EAe is not greater than the threshold value Eth (timing Tb2), the stop start controller 200 continues prohibition of the stop control by the stop controller 212. When the estimated auxiliary voltage value EAe becomes greater than the threshold value Eth with charge of the storage battery 60 (timing Tb3), the stop start controller 200 permits the stop controller 212 to perform the stop control.

After the permission for the stop controller 212 to perform the stop control (timing Tb3), upon satisfaction of a condition for the stop control by the stop controller 212 (timing Tb4), the stop start controller 200 enables the stop controller 212 to stop the internal combustion engine 20. Subsequently, upon satisfaction of a condition for the restart control by the restart controller 214 (timing Tb5), the stop start controller 200 enables the restart controller 214 to restart the internal combustion engine 20.

After the restart of the internal combustion engine 20 (timing Tb5), while the estimated auxiliary voltage value EAe is greater than the threshold value Eth (timings Tb6, Tb7), the stop start controller 200 continues the permission for the stop controller 212 to perform the stop control. When the estimated auxiliary voltage value EAe becomes equal to or less than the threshold value Eth with discharge of the storage battery 60 (timing Tb8), the stop start controller 200 prohibits the stop controller 212 from performing the stop control.

The embodiment described above determines whether the stop control by the stop controller 212 is feasible by taking into account the voltage of the electric auxiliary. This results in enhancing the effect of idle reduction, while ensuring the operation of the electric auxiliary.

The above embodiment determines whether the stop control by the stop controller 212 is feasible in a flexible manner according to a variation in estimated auxiliary voltage value EAe.

The above embodiment calculates the estimated auxiliary voltage value EAe, based on the measured auxiliary voltage value EAm and the variation DEBe. This enhances the accuracy of the estimated auxiliary voltage value EAe.

The above embodiment determines whether the stop control by the stop controller 212 is feasible, based on the measured auxiliary voltage value EAm that is measured on each of the occasion of start of the vehicle 10 by the operation of the starter switch 72 and the occasion of execution of the restart control by the restart controller 214.

The above embodiment uses the voltage of the terminal 202 provided in the stop start controller 200 as the measured auxiliary voltage value EAm and thus enables the measured auxiliary voltage value EAm to be readily obtained, compared with the case of using a voltage of another electric auxiliary.

B. Other Embodiments

The invention is not limited to any of the embodiment, the examples and the modifications described above but may be implemented by a diversity of other configurations without departing from the scope of the invention. For example, the technical features of the embodiment, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

For example, at least part of the auxiliary voltage acquirer 230 and the feasibility determiner 240 may be provided in another electric auxiliary in addition to the stop start controller 200 or may be provided in another electric auxiliary in place of the stop start controller 200.

The auxiliary voltage acquirer 230 may obtain an internal voltage of the stop start controller 200, as the measured auxiliary voltage value EAm. The auxiliary voltage acquirer 230 may also obtain voltages of a plurality of electric auxiliaries, as the measured auxiliary voltage value EAm.

REFERENCE SIGNS LIST 10 vehicle
20 internal combustion engine
30 power transmission mechanism
40 drive wheels
52 starting motor
54 generator
60 storage battery
72 starter switch
74 accelerator pedal sensor
76 brake pedal sensor
80 wiring
100 internal combustion engine controller
200 stop start controller
202 terminal
204 voltage sensor
206 communication interface
208 communication interface
212 stop controller
214 restart controller
230 auxiliary voltage acquirer
240 feasibility determiner
241 auxiliary voltage estimator
242 variation calculator
244 estimated value calculator
248 determination switcher
300 electric auxiliaries
700 battery sensor
712 voltage sensor
714 current sensor
716 temperature sensor
732 open circuit voltage estimator
734 starting current measurer
736 temperature estimator
750 battery simulator
762 state of health estimator
764 state of charge estimator
766 battery voltage estimator
780 communication interface
EAe estimated auxiliary voltage value
EAm measured auxiliary voltage value
EBe estimated battery voltage value
EBe1 estimated battery voltage value
EBe2 estimated battery voltage value
DEBe variation
Eth threshold value

What is claimed is:

1. A vehicle comprising:
a storage battery configured to store electric power;
an internal combustion engine configured to be started with electric power supplied from the storage battery;
a stop start controller configured to perform a stop control of stopping the internal combustion engine according to a driving condition of the vehicle and a restart control of restarting the internal combustion engine that has been stopped by the stop control, and
an electric auxiliary configured to operate with the electric power supplied from the storage battery when the restarting of the internal combustion engine is performed;

wherein the stop start controller includes:
an auxiliary voltage acquirer configured to obtain a measured auxiliary voltage value that denotes a voltage of the electric auxiliary measured on occasion of start of the internal combustion engine; and
a feasibility determiner configured to determine whether the stop control is feasible, based on the measured auxiliary voltage value.

2. The vehicle according to claim 1,
wherein the feasibility determiner includes:
an auxiliary voltage estimator configured to estimate an estimated auxiliary voltage value that denotes a voltage of the electric auxiliary expected on occasion of next restart control, based on the measured auxiliary voltage value; and
a determination switcher configured to switch over a result of determination of whether the stop control is feasible, according to the estimated auxiliary voltage value.

3. The vehicle according to claim 2, further comprising a battery voltage estimator configured to estimate an estimated battery voltage value that denotes a voltage of the storage battery expected on occasion of next start of the internal combustion engine,
wherein the auxiliary voltage estimator includes:
a variation calculator configured to calculate a variation of the estimated battery voltage value from a time when the measured auxiliary voltage value has been measured, based on the estimated battery voltage value; and
an estimated value calculator configured to calculate the estimated auxiliary voltage value based on the measured auxiliary voltage value and the variation.

4. The vehicle according to claim 1, wherein the measured auxiliary voltage value includes at least one of a measurement value that denotes a voltage of the electric auxiliary measured on occasion of start of the internal combustion engine accompanied with a start of the vehicle, and a measurement value that denotes a voltage of the electric auxiliary measured on occasion of restart of the internal combustion engine accompanied with execution of the restart control.

5. The vehicle according to claim 1, wherein
the electric auxiliary includes the stop start controller,
the stop start controller includes a terminal configured to receive the electric power supplied from the storage battery, and
a voltage of the electric auxiliary is a voltage of the terminal.

6. A control apparatus, in a vehicle including a storage battery, an internal combustion engine and an electric auxiliary, configured to perform a stop control of stopping the internal combustion engine according to a driving condition of the vehicle and a restart control of restarting the internal combustion engine that has been stopped by the stop control, the electric auxiliary being configured to operate with the electric power supplied from the storage battery when the restarting of the internal combustion engine is performed, the control apparatus comprising:
an auxiliary voltage acquirer configured to obtain a measured auxiliary voltage value that denotes a voltage of the electric auxiliary measured on occasion of start of the internal combustion engine; and
a feasibility determiner configured to determine whether the stop control is feasible, based on the measured auxiliary voltage value.

7. A control method, in a vehicle including a storage battery, an internal combustion engine and an electric auxiliary, for performing a stop control of stopping the internal combustion engine according to a driving condition of the vehicle and a restart control of restarting the internal combustion engine that has been stopped by the stop control, the electric auxiliary being configured to operate with the electric power supplied from the storage battery when the restarting of the internal combustion engine is performed, the control method comprising:

obtaining a measured auxiliary voltage value that denotes a voltage of the electric auxiliary measured on occasion of start of the internal combustion engine; and determining whether the stop control is feasible, based on the measured auxiliary voltage value.

* * * * *